(12) United States Patent
Geiser et al.

(10) Patent No.: US 11,713,789 B1
(45) Date of Patent: Aug. 1, 2023

(54) CLUTCH ASSEMBLY

(71) Applicant: Schaeffler Technologies AG & Co. KG, Herzogenaurach (DE)

(72) Inventors: Jordan Geiser, Massillon, OH (US); Carsten Behler, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/683,866

(22) Filed: Mar. 1, 2022

(51) Int. Cl.
*F16D 41/12* (2006.01)
*F16D 41/04* (2006.01)
*F16H 3/62* (2006.01)
*F16D 47/04* (2006.01)

(52) U.S. Cl.
CPC ............. *F16D 41/12* (2013.01); *F16D 47/04* (2013.01); *F16H 3/62* (2013.01)

(58) Field of Classification Search
CPC .... F16D 41/04; F16D 41/12–16; F16D 23/14; F16D 11/10; F16D 11/14; F16D 47/04
See application file for complete search history.

(56) References Cited

U.S. PATENT DOCUMENTS

| | | | |
|---|---|---|---|
| 5,597,057 A | 1/1997 | Ruth et al. | |
| 5,971,122 A | 10/1999 | Costin | |
| 6,125,979 A | 10/2000 | Costin et al. | |
| 7,100,756 B2 | 9/2006 | Kimes et al. | |
| 7,101,301 B2 * | 9/2006 | Haka .................... | B60K 17/346 475/311 |
| 7,694,793 B2 * | 4/2010 | Wittkopp ................ | F16D 23/06 192/53.34 |
| 9,011,289 B2 | 4/2015 | Goleski et al. | |
| 10,006,507 B2 * | 6/2018 | Lee ......................... | F16D 41/12 |
| 2004/0180749 A1 * | 9/2004 | Haka ..................... | B60K 17/346 475/210 |
| 2006/0021838 A1 | 2/2006 | Kimes et al. | |
| 2008/0047798 A1 * | 2/2008 | Wittkopp ................ | F16D 23/06 192/53.34 |
| 2008/0185253 A1 | 8/2008 | Kimes et al. | |
| 2015/0111682 A1 | 4/2015 | Park et al. | |
| 2017/0023074 A1 | 1/2017 | Rivera | |
| 2017/0138416 A1 * | 5/2017 | Lee ......................... | F16D 23/14 |
| 2018/0266502 A1 | 9/2018 | Shioiri et al. | |
| 2022/0397164 A1 * | 12/2022 | Geiser ..................... | F16D 11/10 |

FOREIGN PATENT DOCUMENTS

| | | |
|---|---|---|
| GB | 679161 A | 9/1952 |
| KR | 10-1428421 B1 | 8/2014 |

* cited by examiner

*Primary Examiner* — David R Morris
(74) *Attorney, Agent, or Firm* — Volpe Koenig

(57) ABSTRACT

A clutch assembly is disclosed herein that generally has at least three operating conditions: an open condition, a transition condition, and a locked condition. The operating conditions are achieved based on displacement of a dog clutch ring relative to a pocket ring and a cam ring. In the open condition, rockers of a ratcheting assembly are completely disengaged from ramps on a cam ring. In the transition condition, the rockers engage with the ramps on the cam ring to allow a ratcheting motion in one rotational direction and a locked state in the other rotational direction. In the locked condition, splines on the dog clutch ring engage with splines on the cam ring to provide a rotationally fixed connection in both rotational directions.

20 Claims, 7 Drawing Sheets

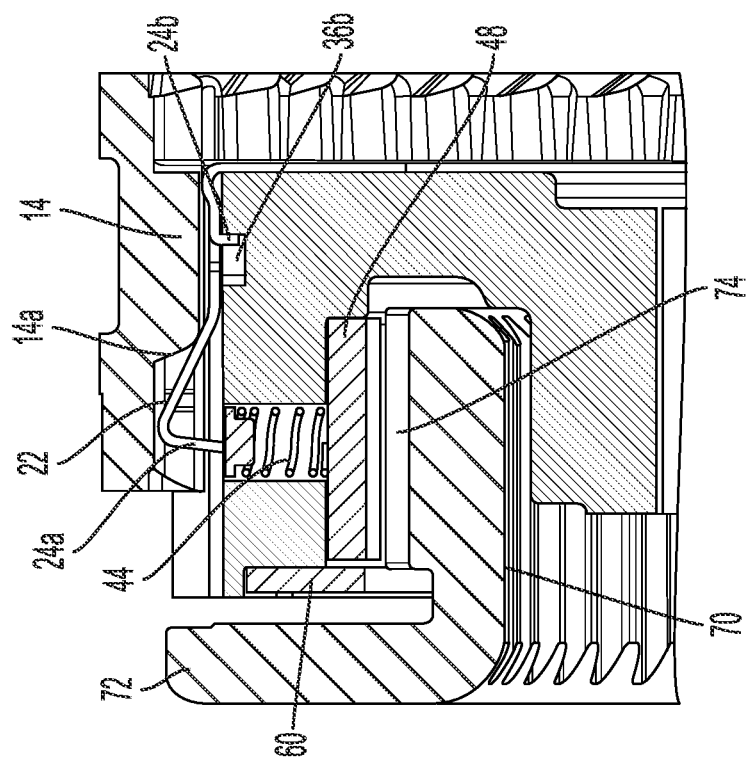
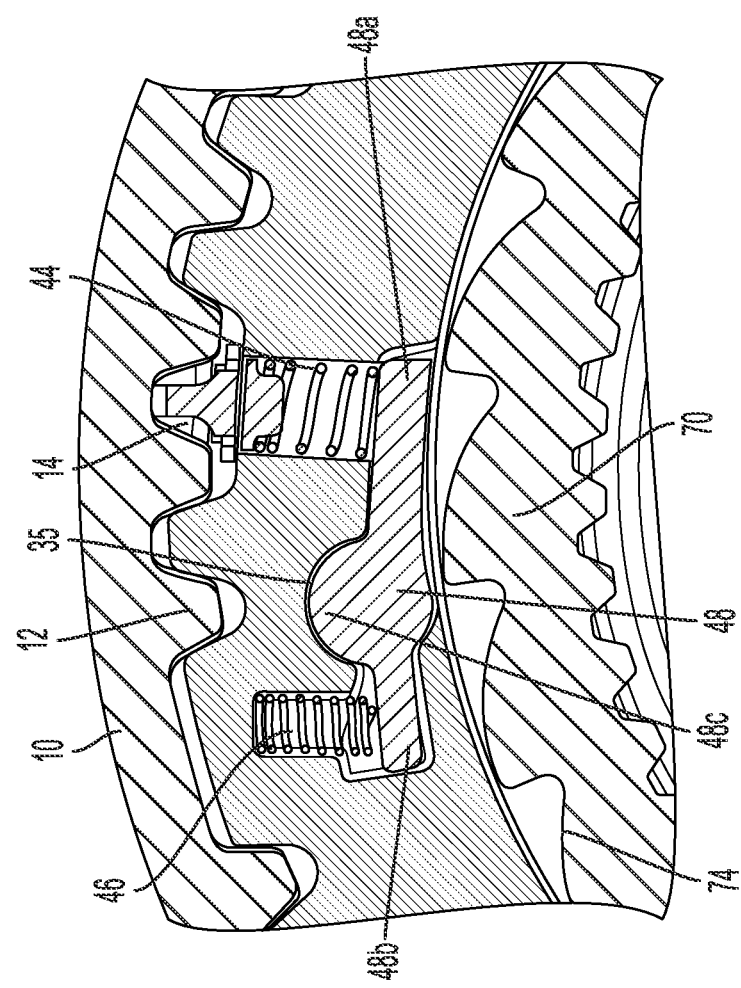
FIG. 5B
FIG. 5A

CLUTCH ASSEMBLY

FIELD OF INVENTION

The present disclosure relates to a clutch assembly, and more particularly relates to a clutch assembly including a dog clutch ring adapted to provide at least three operating conditions for the clutch assembly.

BACKGROUND

Clutch assemblies are well known. One type of known clutch assembly is a one-way clutch, which can generally include a ratcheting assembly that is selectively driven to rotationally lock one component relative to another in one rotational direction, and allow free rotatable motion between the two components in another rotational direction. Ratcheting of rockers and ramps can occur during rotation in one rotational direction, which generates drag losses and creates noise, vibration and harshness (NVH).

It would be desirable to reduce drag losses and avoid NVH issues in one-way clutch designs.

SUMMARY

A clutch assembly is disclosed herein that addresses the issues identified above. The clutch assembly includes a dog clutch ring defining dog clutch splines and a plurality of protrusions. A pocket ring is provided that defines pocket splines configured to mesh with the dog clutch splines. The pocket ring can also define a first set of pockets. A switch ring is provided that defines a plurality of arms each configured to be selectively received within the first set of pockets. A cam ring is provided that defines cam splines and a plurality of ramps. A ratcheting assembly that includes rockers configured to selectively engage with the plurality of ramps is also provided.

The dog clutch ring is configured to be axially displaced via an actuator between at least three axial positions, which correspond to an open condition, a transition condition, and a locked condition.

In a first axial position of the dog clutch ring, the rockers are disengaged from the ramps. This refers to an open condition, and specifically reduces drag losses and NVH concerns because the rockers are completely clear from and disengaged from the ramps.

In a second axial position for the dog clutch ring, the protrusions on the dog clutch ring drive the arms into the first set of pockets such that the plurality of rockers become engaged with the plurality of ramps. This is a transition condition in which rotation in one rotational direction is prevented due to the geometry of the ramps, and ratcheting is permitted in a second rotational direction.

In a third axial position for the dog clutch ring, the dog clutch splines engage with the cam splines and provide a fully locked mode or condition. In this mode, torque is transmitted via engagement between the dog clutch splines and the cam splines. This allows for rotational locking of these components in both rotational directions.

The ratcheting assembly can further include engagement springs configured to engage a first end of the rockers, biasing spring configured to engage a second end of the rockers, and caps arranged between the engagement springs and the arms. The caps can serve as an interface or support surface between the arms and the engagement springs. One of ordinary skill in the art would understand other caps or configurations could be used, or the caps can be omitted.

The biasing springs are configured to bias or drive the rockers away from the ramps when the dog clutch ring is in the first axial position, i.e. the open condition.

The protrusions on the dog clutch ring can be formed as radially inward projections. The protrusions can include a ramped surface configured to engage the arms of the switch ring. The protrusions can generally drive the arms radially inward, in one configuration, such that the arms press the rockers radially inward and into the ramps.

The dog clutch ring and the pocket ring can be configured to be rotationally fixed in the first, second, and third axial positions of the dog clutch ring. In other words, the dog clutch ring and the pocket ring can be rotationally fixed regardless of the axial position of the dog clutch ring.

The pocket ring and the cam ring can be freely rotatable when the dog clutch ring is in the first axial position (i.e. open condition). The pocket ring and the cam ring can be rotationally locked only in a first rotational direction when the dog clutch ring is in the second axial position (i.e. transition condition). The pocket ring and the cam ring can be rotationally locked in a first and second rotational direction when the dog clutch ring is in the third axial position (i.e. locked condition).

The arms on the switch ring can define a first plurality of switch fingers and a second plurality of switch fingers. The pocket ring can define a second set of pockets, and the first plurality of switch fingers can be configured to be selectively received within the first set of pockets, while the second plurality of switch fingers remain engaged within the second set of pockets.

In one aspect, a clutch assembly is disclosed that includes a dog clutch ring including dog clutch splines. The dog clutch ring is configured to be axially displaced via an actuator to at least a first axial position, a second axial position, and a third axial position. The assembly also includes a pocket ring, a cam ring including cam splines, and a ratcheting assembly. The ratcheting assembly is configured to be selectively: (i) disengaged such that the pocket ring and the cam ring can freely rotate in a first and second rotational direction relative to each other when the dog clutch ring is in the first axial position; and (ii) engaged such that the pocket ring and the cam ring are rotationally locked only in the first rotational direction when the dog clutch ring is in the second axial position. Ratcheting can occur in the second rotational direction when the ratcheting assembly is engaged. The dog clutch splines are configured to engage with the cam splines when the dog clutch ring is in the third axial position such that the dog clutch ring and the cam ring are rotationally fixed relative to each other.

Additional embodiments and aspects are disclosed herein.

BRIEF DESCRIPTION OF THE DRAWINGS

The foregoing Summary and the following Detailed Description will be better understood when read in conjunction with the appended drawings, which illustrate a preferred embodiment of the disclosure. In the drawings:

FIG. 5A is a front cross-sectional view of the clutch assembly in the open condition.

FIG. 5B is a side cross-sectional view of the clutch assembly in the open condition.

DETAILED DESCRIPTION OF THE PREFERRED EMBODIMENTS

Figure 1:
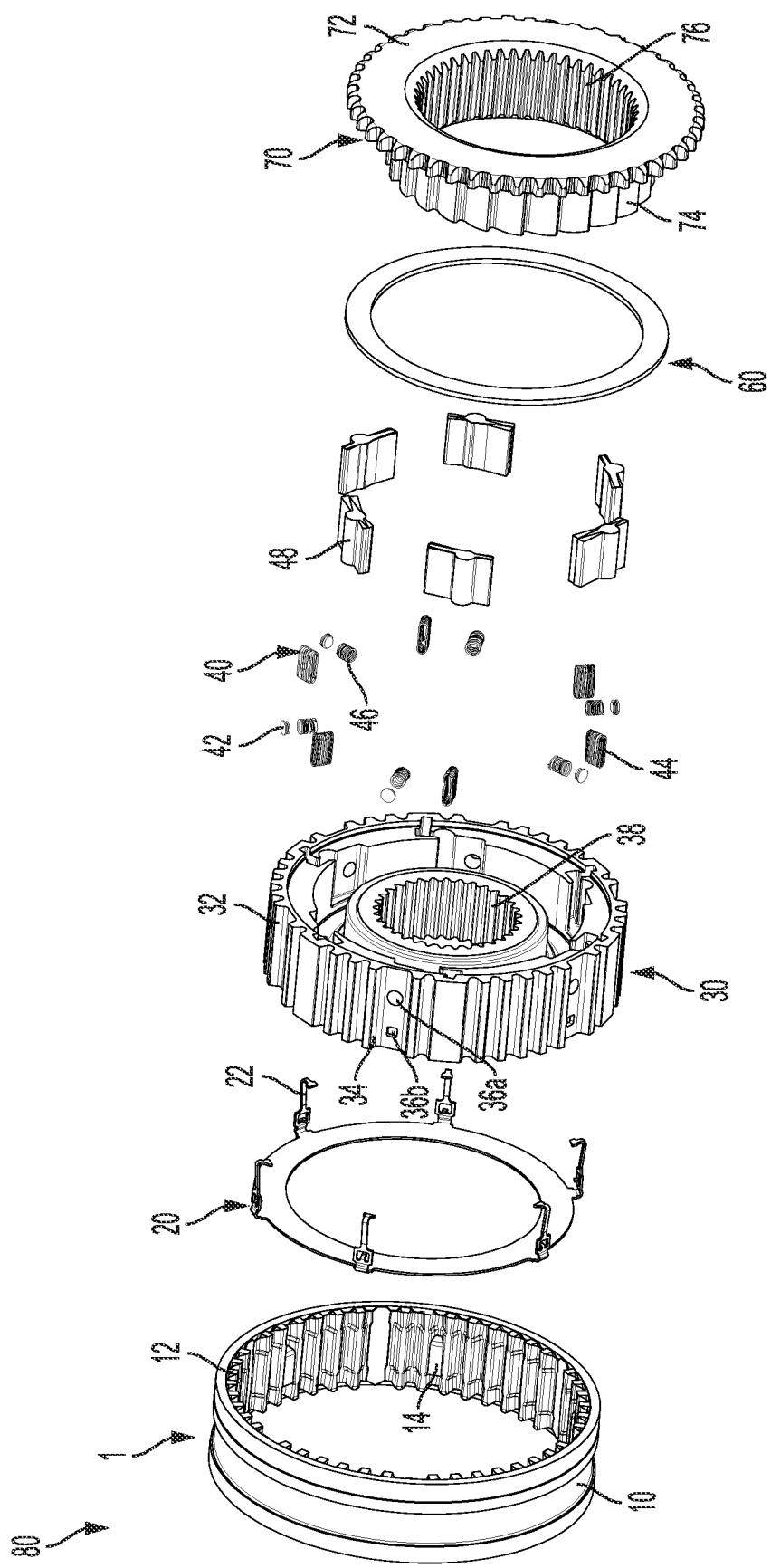
FIG. 1 is an exploded perspective view of a clutch assembly.
Figure 2B:
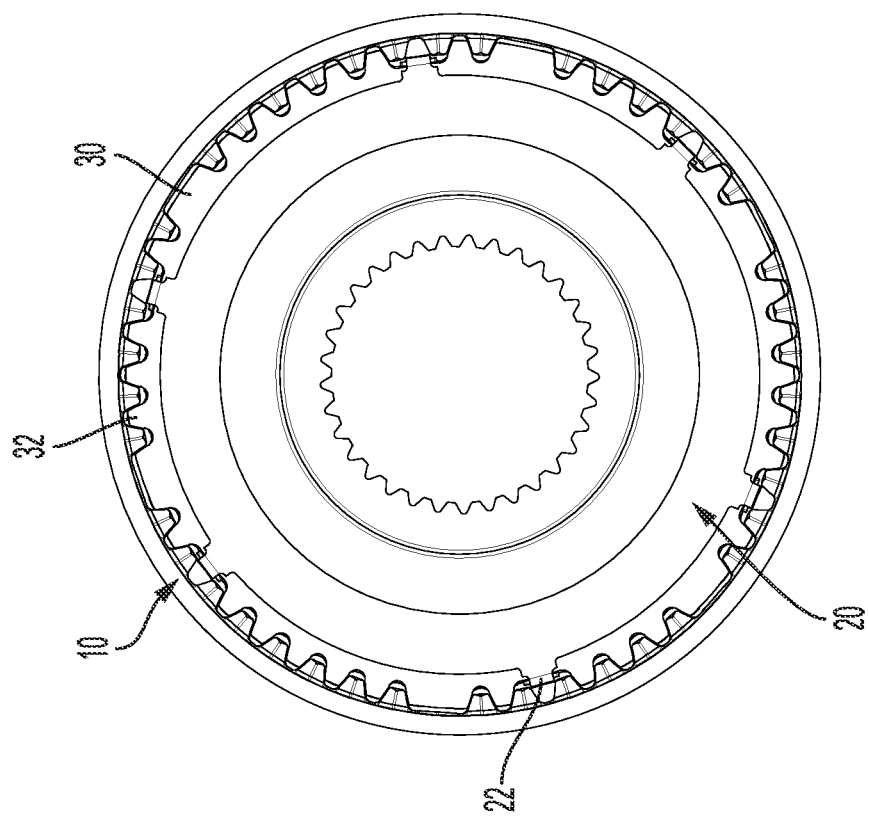
FIG. 2B is a rear view of the clutch assembly.
Figure 2A:
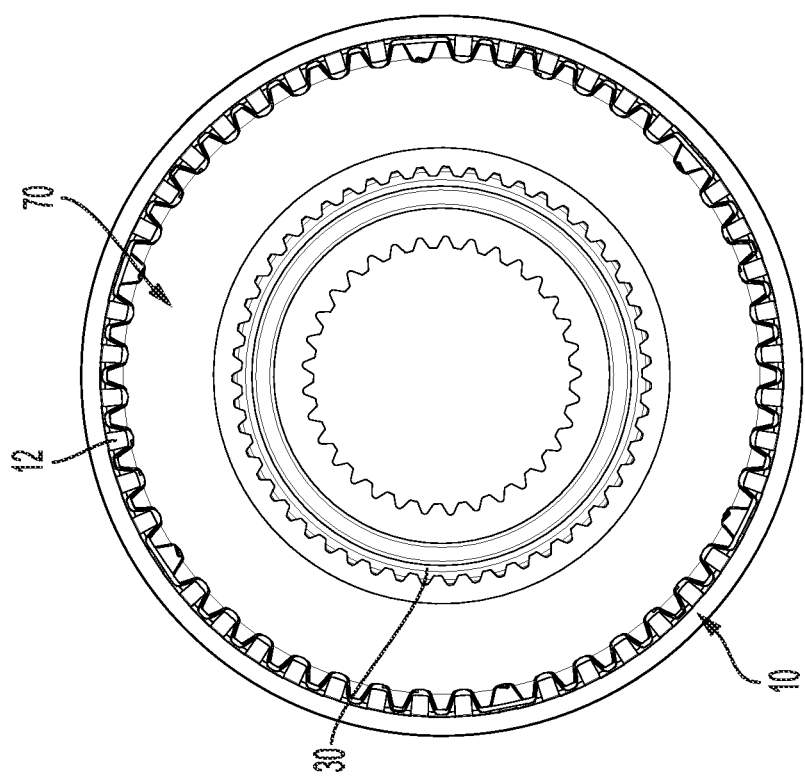
FIG. 2A is a front view of the clutch assembly.

Certain terminology is used in the following description for convenience only and is not limiting. "Axially" refers to a direction along an axis (X) of an assembly, as shown in FIG. 1A. "Radially" refers to a direction inward and outward from the axis (X) of the assembly, i.e. in the "Y" direction as shown in FIG. 1A.

A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

As shown in FIGS. 1-7B, a clutch assembly 1 is disclosed. The clutch assembly 1 includes a dog clutch ring 10 defining dog clutch splines 12 and a plurality of protrusions 14. The dog clutch splines 12 can be formed on a radially inner surface of the dog clutch ring 10. Alternatively, the dog clutch splines 12 could be formed on another surface of the dog clutch ring 10. The plurality of protrusions 14 can also be formed on a radially inner surface of the dog clutch ring 10. One of ordinary skill in the art would understand that the location of the protrusions 14 can vary. The protrusions 14 can be formed as ramped surfaces on the dog clutch ring 10. In one aspect, the protrusions 14 can include a ramped side 14a that is configured to drive arms 22 of the switch ring 20, as described in more detail herein. The dog clutch ring 10 is generally configured to transfer torque from a pocket ring 30 to the cam ring 70, as described in more detail herein.

A pocket ring 30 is provided that defines pocket splines 32 configured to mesh with the dog clutch splines 12. The pocket ring 30 also can include a first set of pockets 36a and a second set of pockets 36b. Each of these pockets 36a, 36b is configured to receive or retain a portion of the switch ring 20. The pocket ring 30 can include a first drive spline 38 that is configured to engage or mate with another component, such as an input drive shaft, etc. In one aspect, the pocket ring 30 can be connected to any component in a transmission, including components other than shafts. The pocket ring 30 can generally be configured to transfer torque to the cam ring 70 in one direction via the ratcheting assembly 40, as described in more detail herein.

The switch ring 20 can include a plurality of arms 22 each configured to be selectively received within the first set of pockets 36a, based on the amount of engagement between the protrusions 14 and the arms 22. The plurality of arms 22 can include a first plurality of switch fingers 24a and a second plurality of switch fingers 24b. In one aspect, the first plurality of switch fingers 24a can be longer than the second plurality of switch fingers 24b. The first plurality of switch fingers 24a can have a curved profile, in one aspect. The second plurality of switch fingers 24b can also include a curved profile. One of ordinary skill in the art would understand that the exact shape or profile of the fingers 24a, 24b can vary.

The first plurality of switch fingers 24a are configured to engage within the first set of pockets 36a to selectively engage a portion of a ratcheting assembly 40 as described in more detail herein. The second plurality of switch fingers 24b are configured to be retained within the second set of pockets 36b. Based on this retention, the switch ring 20 is fixed to the pocket ring 30, and the switch fingers 24a remain aligned with the first set of pockets 36a.

Figure 4:
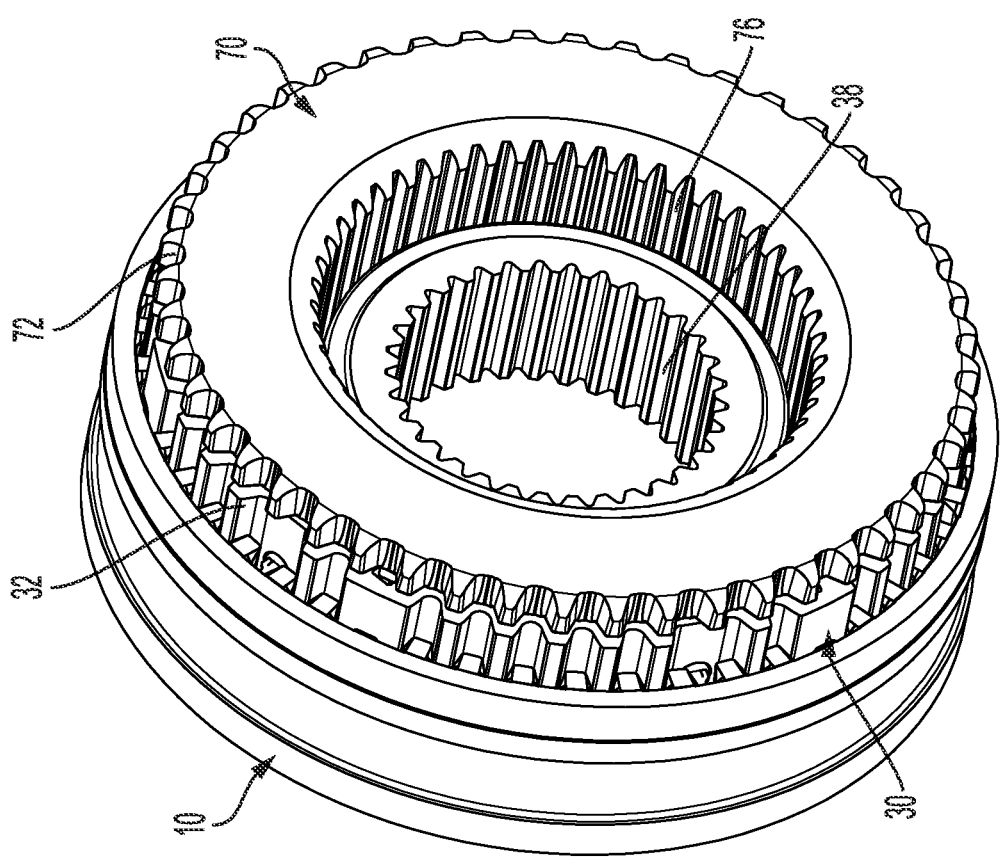
FIG. 4 is a perspective view of the clutch assembly in an assembled state.

The cam ring 70 includes cam splines 72 and a plurality of ramps 74. The cam splines 72 are configured to be engaged with the dog clutch splines 12 depending on an axial position of the dog clutch ring 10. The cam ring 70 can further include a second drive spline 76 that is configured to mate or engage with an output drive shaft, etc. In one aspect, the cam ring 70 can be connected to any component in a transmission, including components other than shafts. FIG. 4 illustrates how the first drive spline 38 and the second drive spline 76 can be arranged to be connected to two different components, such as shafts or other transmission related components.

The cam splines 72 can be arranged on a radially outermost portion of the cam ring 70. One of ordinary skill in the art would understand that the location of the cam splines 72 can vary.

A ratcheting assembly 40 is provided that generally is configured to provide either a freely rotational state or a one-way locking state between the cam ring 70 and the pocket ring 30. The ratcheting assembly 40 comprises a plurality of rockers 48 configured to selectively engage with the plurality of ramps 74 to provide a one-way rotational locking state. In this state, ratcheting can occur in the non-locking rotational direction.

The rockers 48 can be supported within the pocket ring 30 via a support surface 35, as shown in FIG. 5A. The support surface 35 is curved and complementary to a curved portion or cam 48c on the rockers 48, thereby allowing pivoting or rotational movement of the rockers 48. Other configurations for rotationally supporting the rockers 48 such that the rockers 48 can pivot can be used.

The dog clutch ring 10 is configured to be axially displaced via an actuator 80 between at least three axial positions. The actuator 80 is illustrated as a schematic element in the Figures, and one of ordinary skill in the art would understand that various types of actuators could be used. Some known types of actuators include solenoid actuators, which can be electronically driven to selectively displace an actuator rod or pusher into an adjacent element, such as the dog clutch ring 10. In one aspect, the actuator can be a shift fork that is driven by either a motor or a solenoid. Various types of actuating configurations can be used to drive the dog clutch ring 10.

The dog clutch ring 10 can be displaced to three primary axial positions. One of ordinary skill in the art would understand that additional states or axial positions are possible and different or additional locking modes can be provided. In one aspect, the actuator 80 is a variable actuator and can selectively drive the dog clutch ring 10 to at least three axial positions, as well as various intermediate positions.

Figure 3C:
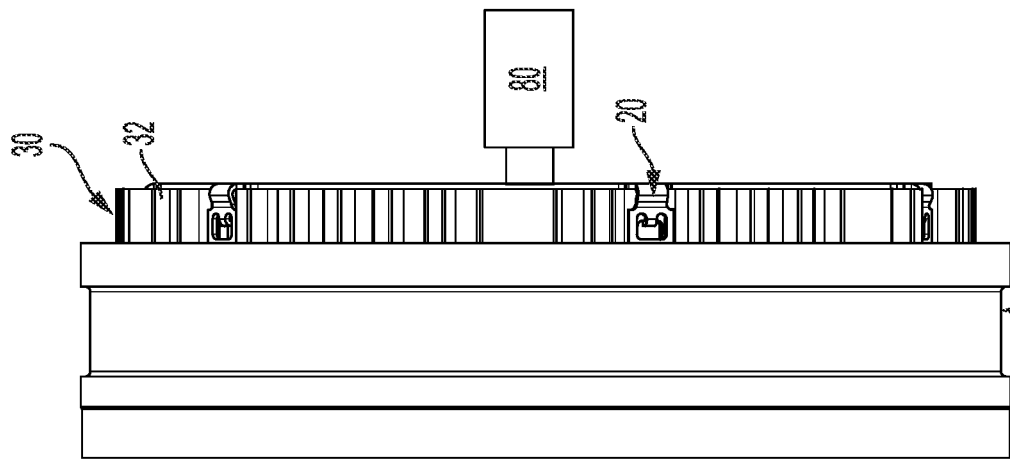
FIG. 3C is a side view of the clutch assembly in a locked condition.
Figure 3B:
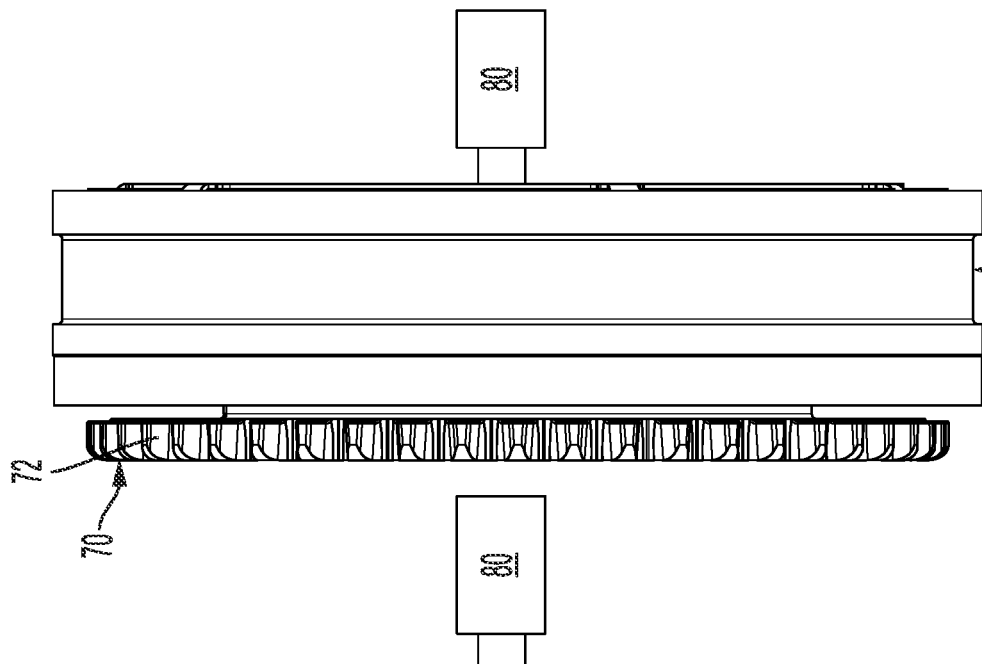
FIG. 3B is a side view of the clutch assembly in a transition condition.
Figure 3A:
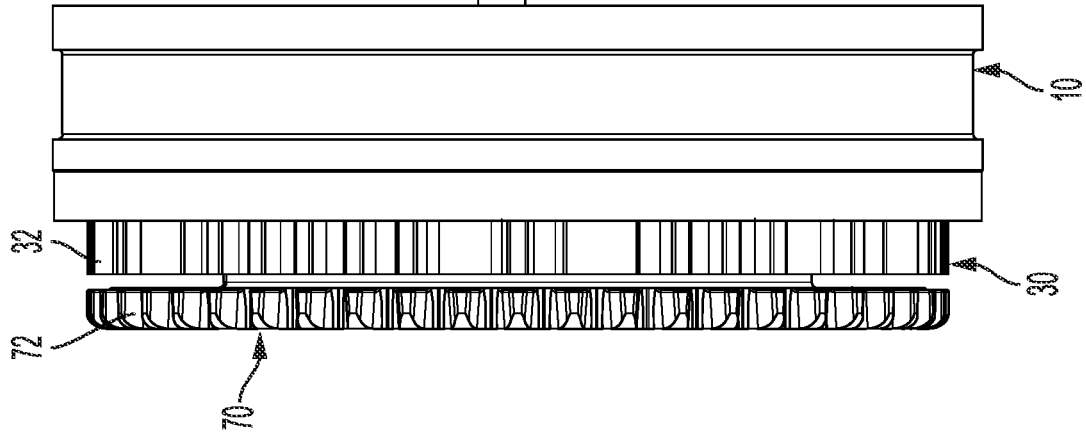
FIG. 3A is a side view of the clutch assembly in an open condition.

In a first axial position of the dog clutch ring 10, the plurality of rockers 48 are disengaged from the plurality of ramps 74. This position of the dog clutch ring 10 refers to an open condition, in which the pocket ring 30 and the cam ring 70 are freely rotatable (i.e. no contact occurs between the rockers 48 and the ramps 74). This state is shown in FIGS. 3A, 5A, and 5B.

In the open condition, the rockers 48 remain completely disengaged from the ramps 74 and do not extend into an outer circumference defined by the ramps 74 of the cam ring 70. The biasing spring 46 ensures that the rockers 48 remain pivoted away from allowing the first end 48a of the rockers 48 to engage within the ramps 74. In other words, based on the configuration disclosed herein, the ratcheting assembly 40, and more specifically the rockers 48, do not have to ratchet in the open condition. This provides reduced drag forces and reduced NVH in the open condition.

Figure 6B:
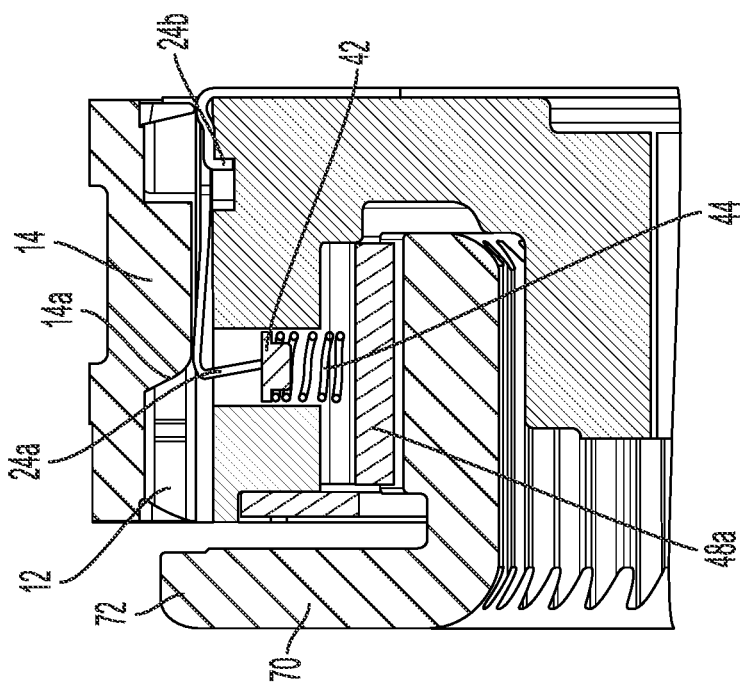
FIG. 6B is a side cross-sectional view of the clutch assembly in the transition condition.
Figure 6A:
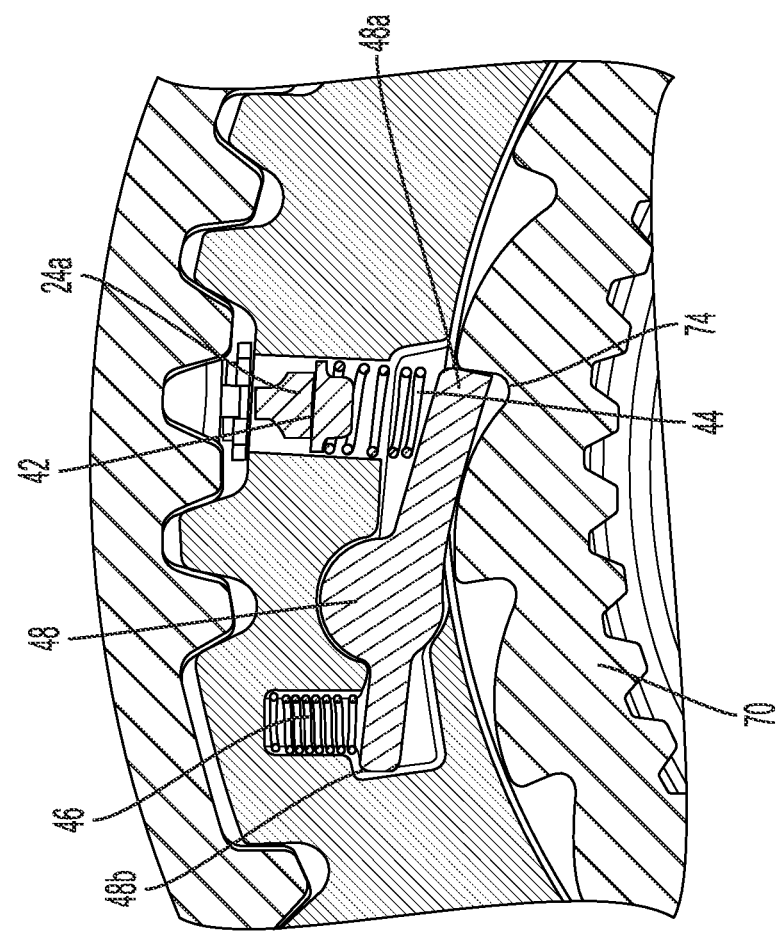
FIG. 6A is a front cross-sectional view of the clutch assembly in the transition condition.

In a second axial position of the dog clutch ring 10, the plurality of protrusions 14 drive the plurality of arms 22 into the first set of pockets 36a such that the plurality of rockers 48 engage with the plurality of ramps 74. This position of the dog clutch ring 10 refers to a transition condition, in which the pocket ring 30 and the cam ring 70 are rotationally locked only in a first rotational direction. This state is shown in FIGS. 3B, 6A, and 6B. The term second axial position is used herein to refer to any one of a plurality of axial positions between the first and third axial positions of the dog clutch ring 10. Stated differently, the second axial position refers to a range or transition zone and does not necessarily refer to one single axial position.

Referring to FIG. 6A, locking occurs if the pocket ring 30 is driven in the clockwise direction or if the cam ring 70 is driven in the counterclockwise direction, and ratcheting occurs if the pocket ring 30 is driven in the counterclockwise direction or if the cam ring 70 is driven in the clockwise direction.

In the first and second axial positions of the dog clutch ring 10, as shown by FIGS. 3A, 3B, 5A, 5B, 6A, and 6B, the dog clutch splines 12 remain axially spaced away from the cam splines 72.

Figure 7B:
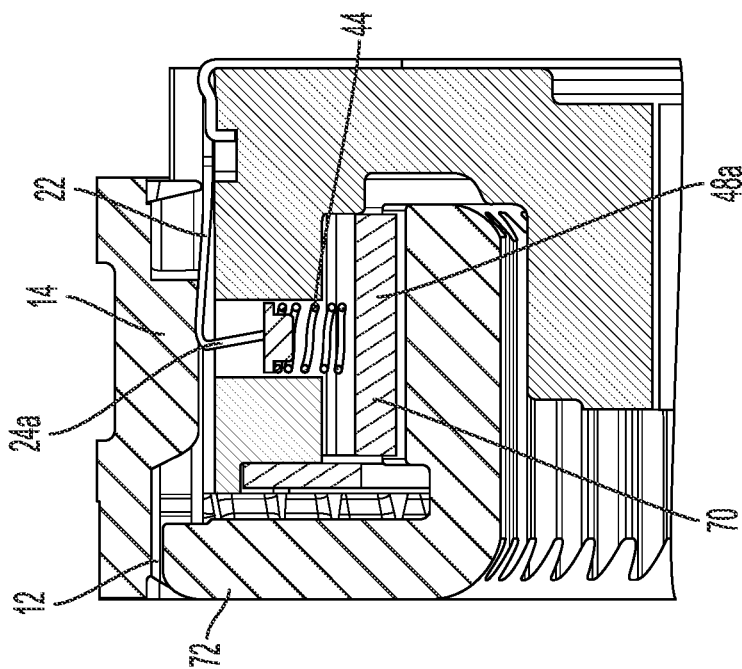
FIG. 7B is a side cross-sectional view of the clutch assembly in the locked condition.
Figure 7A:
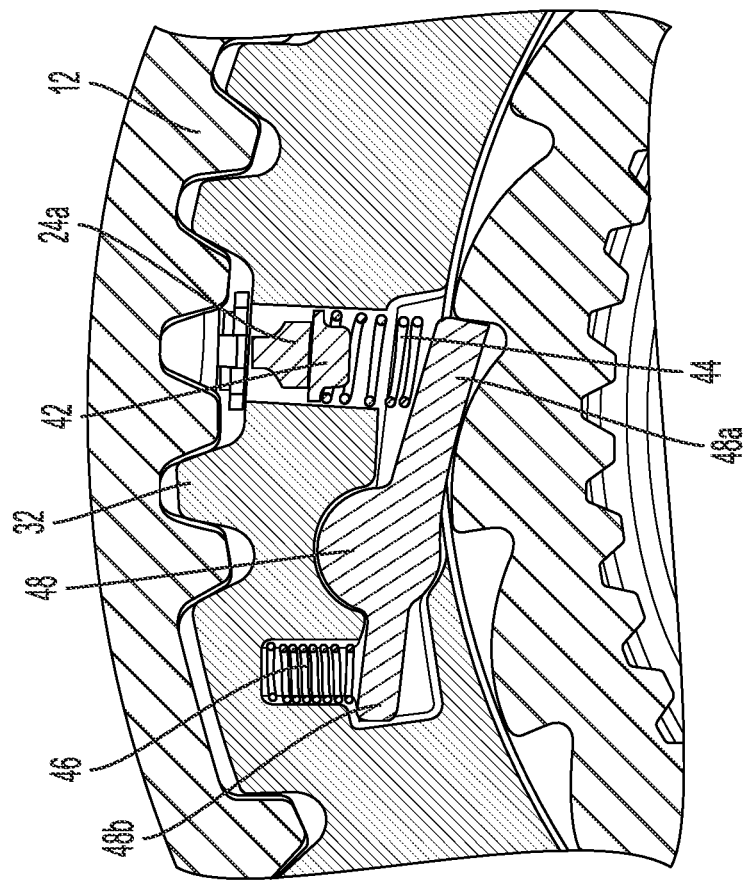
FIG. 7A is a front cross-sectional view of the clutch assembly in the locked condition.

In a third axial position of the dog clutch ring 10, the dog clutch splines 12 engage with the cam splines 72. This position of the dog clutch ring 10 refers to a locked condition, in which the pocket ring 30 and the cam ring 70 are rotationally locked in a first and second rotational direction. This state is shown in FIGS. 3C, 7A, and 7B.

The ratcheting assembly 40 can further comprise a plurality of engagement springs 44 configured to engage a first end 48a of the plurality of rockers 48, a plurality of biasing spring 46 configured to engage a second end 48b of the plurality of rockers 48, and a plurality of caps 42 arranged between the plurality of engagement springs 44 and the plurality of arms 22. The plurality of biasing springs 46 are configured to drive the plurality of rockers 48 away from the plurality of ramps 74 when the dog clutch ring 10 is in the first axial position (i.e. open condition). In the second axial position (i.e. transition condition) and third axial position (i.e. locked condition), the rockers 48 are driven towards the ramps 74 (i.e. the force from the biasing springs 46 is overcome).

In the third axial position (i.e. locked condition), engagement between the dog clutch splines 12 and the cam splines 72 provides a rotational locking function in both rotational directions. The engagement springs 44 can generally be configured to overcome the force of the biasing springs 46 and push the rockers 48 into engagement with the ramps 74 when the clutch is either in the transition condition or locked condition. The biasing springs 46 can generally be configured to keep the ratcheting assembly disengaged (i.e. freely rotating) when the clutch assembly is in the open condition.

The dog clutch ring 10 and the pocket ring 30 can be rotationally fixed in the first, second, and third axial positions of the dog clutch ring 10. This rotational fixation or locking can be provided via engagement between the dog clutch splines 12 and the pocket splines 32. The dog clutch ring 10 can be free to move axially with respect to the pocket ring 30 based on the splines 12, 32 extending axially and only providing rotational locking or fixation.

The positioning of the pockets 36a on the pocket ring 30 can be circumferentially arranged such that the dog clutch splines 12 are aligned with and can engaged with the cam splines 72 when the pocket ring 30 and the cam ring 70 are locked through the ratcheting assembly 40.

The clutch assembly 1 can further comprise a cover ring 60 that is configured to retain at least a portion for the ratchet assembly 40 relative to the pocket ring 30. The cover ring 60 can be staked or pressed into a groove formed on the pocket ring 30, as shown in FIG. 5B and can define an abutment surface for the rockers 48.

Having thus described the present disclosure in detail, it is to be appreciated and will be apparent to those skilled in the art that many physical changes, only a few of which are exemplified in the detailed description of the invention, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the embodiments being indicated by the appended claims rather than by the foregoing description, and all alternate embodiments and changes to this embodiment which come within the meaning and range of equivalency of said claims are therefore to be embraced therein.

LOG OF REFERENCE NUMERALS

Clutch assembly 1
Dog clutch ring 10
Dog clutch splines 12
Protrusions 14
ramped side 14a
Switch ring 20
Switch arms 22
Switch fingers 24a, 24b
Pocket ring 30
Pocket splines 32
Slots 34
Support surface 35
Pockets 36a, 36b
First drive spline 38
Ratcheting assembly 40
Cap 42
Engagement spring 44
Bias spring 46
Rocker 48
First end 48a of rocker
Second end 48b of rocker
Cam 48c
Cover ring 60
Cam ring 70
Cam splines 72
Ramps 74
Actuator 80

What is claimed is:

1. A clutch assembly comprising:
a dog clutch ring defining dog clutch splines and a plurality of protrusions;
a pocket ring defining pocket splines configured to mesh with the dog clutch splines, the pocket ring defining a first set of pockets;
a switch ring defining a plurality of arms each configured to be selectively received within a respective pocket of the first set of pockets;
a cam ring defining cam splines and a plurality of ramps; and
a ratcheting assembly including a plurality of rockers configured to selectively engage with the plurality of ramps,
wherein the dog clutch ring is configured to be axially displaced via an actuator between at least:
(i) a first axial position in which the plurality of rockers are disengaged from the plurality of ramps;
(ii) a second axial position in which the plurality of protrusions drive the plurality of arms into the first set of pockets such that the plurality of rockers engage with the plurality of ramps; and
(iii) a third axial position in which the dog clutch splines engage the cam splines.

2. The clutch assembly according to claim 1, wherein the ratcheting assembly further comprises a plurality of engagement springs configured to engage a first end of the plurality of rockers, a plurality of biasing spring configured to engage a second end of the plurality of rockers, and a plurality of caps arranged between the plurality of engagement springs 44 and the plurality of arms.

3. The clutch assembly according to claim 2, wherein the plurality of biasing springs drive the plurality of rockers away from the plurality of ramps when the dog clutch ring is in the first axial position.

4. The clutch assembly according to claim 1, wherein the plurality of protrusions are formed as radially inward projections on the dog clutch ring.

5. The clutch assembly according to claim 4, wherein the plurality of protrusions include a ramped surface configured to engage the plurality of arms.

6. The clutch assembly according to claim 1, wherein the dog clutch ring and the pocket ring are rotationally fixed in the first, second, and third axial positions of the dog clutch ring.

7. The clutch assembly according to claim 1, wherein the pocket ring and the cam ring are freely rotatable when the dog clutch ring is in the first axial position.

8. The clutch assembly according to claim 1, wherein the pocket ring and the cam ring are rotationally locked only in a first rotational direction when the dog clutch ring is in the second axial position.

9. The clutch assembly according to claim 1, wherein the pocket ring and the cam ring are rotationally locked in a first and second rotational direction when the dog clutch ring is in the third axial position.

10. The clutch assembly according to claim 1, wherein the plurality of arms on the switch ring define a first plurality of switch fingers and a second plurality of switch fingers, and the pocket ring defines a second set of pockets, and the first plurality of switch fingers are configured to be selectively received within the first set of pockets, and the second plurality of switch fingers are engaged received within the second set of pockets.

11. A clutch assembly comprising:
a dog clutch ring including dog clutch splines, the dog clutch ring being configured to be axially displaced via an actuator to at least a first axial position, a second axial position, and a third axial position;
a pocket ring;
a cam ring including cam splines;
a ratcheting assembly configured to be selectively:
(i) disengaged such that the pocket ring and the cam ring can freely rotate in a first and second rotational direction relative to each other when the dog clutch ring is in the first axial position; and
(ii) engaged such that the pocket ring and the cam ring are rotationally locked only in the first rotational direction when the dog clutch ring is in the second axial position;
wherein the dog clutch splines engage with the cam splines when the dog clutch ring is in the third axial position such that the dog clutch ring and the cam ring are rotationally fixed relative to each other.

12. The clutch assembly according to claim 11, further comprising a switch ring defining a plurality of arms that are configured to engage and disengage the ratcheting assembly.

13. The clutch assembly according to claim 12, wherein the plurality of arms on the switch ring define a first plurality of switch fingers and a second plurality of switch fingers, and the pocket ring defines a first set of pockets for the first plurality of switch fingers and a second set of pockets for the second plurality of switch fingers.

14. The clutch assembly according to claim 12, wherein the dog clutch ring includes a plurality of protrusions configured to engage the switch ring based on axial displacement of the dog clutch ring.

15. The clutch assembly according to claim 14, wherein the plurality of protrusions on the dog clutch ring include a ramped surface.

16. The clutch assembly according to claim 12, wherein the ratcheting assembly comprises a plurality of rockers, a plurality of engagement springs configured to engage a first end of the plurality of rockers, a plurality of biasing spring configured to engage a second end of the plurality of rockers, and a plurality of caps arranged between the plurality of engagement springs and the plurality of arms.

17. The clutch assembly according to claim 16, wherein the plurality of biasing springs drive the plurality of rockers away from a plurality of ramps on the cam ring when the dog clutch ring is in the first axial position.

18. The clutch assembly according to claim 16, wherein the plurality of biasing springs are compressed due to pivoting of the plurality of rockers during engagement plurality of arms with the plurality of caps.

19. The clutch assembly according to claim 11, wherein the dog clutch ring and the pocket ring are rotationally fixed in the first, second, and third axial positions of the dog clutch ring.

20. The clutch assembly according to claim 11, further comprising a cover ring secured to the pocket ring and configured to retain the ratcheting assembly relative to the pocket ring.

* * * * *